United States Patent
Zhou et al.

(10) Patent No.: US 11,778,556 B2
(45) Date of Patent: Oct. 3, 2023

(54) COMMUNICATION OF WUS INDICATING SELECTED PCIS OF A PCI GROUP

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/184,212

(22) Filed: Feb. 24, 2021

(65) Prior Publication Data

US 2021/0337469 A1 Oct. 28, 2021

Related U.S. Application Data

(60) Provisional application No. 63/015,230, filed on Apr. 24, 2020.

(51) Int. Cl.
*H04W 52/02* (2009.01)
*H04W 76/11* (2018.01)
(Continued)

(52) U.S. Cl.
CPC ... *H04W 52/0229* (2013.01); *H04W 52/0235* (2013.01); *H04W 72/0453* (2013.01);
(Continued)

(58) Field of Classification Search
CPC ......... H04W 52/0229; H04W 72/0453; H04W 72/23; H04W 76/11; H04W 76/28; H04W 52/0235; Y02D 30/70
See application file for complete search history.

(56) References Cited

U.S. PATENT DOCUMENTS

2019/0090193 A1* 3/2019 Liu .................... H04W 52/028
2020/0037396 A1* 1/2020 Islam ................... H04W 88/06
2021/0022075 A1 1/2021 Xu

FOREIGN PATENT DOCUMENTS

WO 2019196038 A1 10/2019

OTHER PUBLICATIONS

Ericsson, DRX with short on-Duration and Wake-up signaling, Aug. 10, 2018, 3GPP TSG-RAN WG2#103 (Year: 2018).*

(Continued)

*Primary Examiner* — Omar J Ghowrwal
(74) *Attorney, Agent, or Firm* — MG-IP Law, P.C.; Nerrie M. Zohn

(57) ABSTRACT

In an aspect, a BS transmits a WUS that includes an indication of selected PCIs of a PCI group to a UE. The UE receives the WAS and monitors one or more configured DRX ON durations associated with the selected PCIs of the PCI group. In another aspect, a BS transmits a signal that includes dormancy status information for a set of selected PCIs to a UE. For each PCI in the set of selected PCIs indicated by the dormancy status information as associated with a dormant state, the UE refrains from PDCCH monitoring on a dormant BWP to which the respective PCI transitions. For each PCI in the set of selected PCIs indicated by the dormancy status information as associated with a non-dormant state, the UE performs PDCCH monitoring on a non-dormant BWP to which the respective PCI transitions.

24 Claims, 14 Drawing Sheets

(51) Int. Cl.
*H04W 76/28* (2018.01)
*H04W 72/0453* (2023.01)
*H04W 72/23* (2023.01)

(52) U.S. Cl.
CPC ............ *H04W 72/23* (2023.01); *H04W 76/11* (2018.02); *H04W 76/28* (2018.02)

(56) References Cited

OTHER PUBLICATIONS

Partial International Search Report—PCT/US2021/019634—ISA/EPO—dated Jun. 15, 2021.
International Search Report and Written Opinion—PCT/US2021/019634—ISA/EPO—dated Aug. 27, 2021.

\* cited by examiner

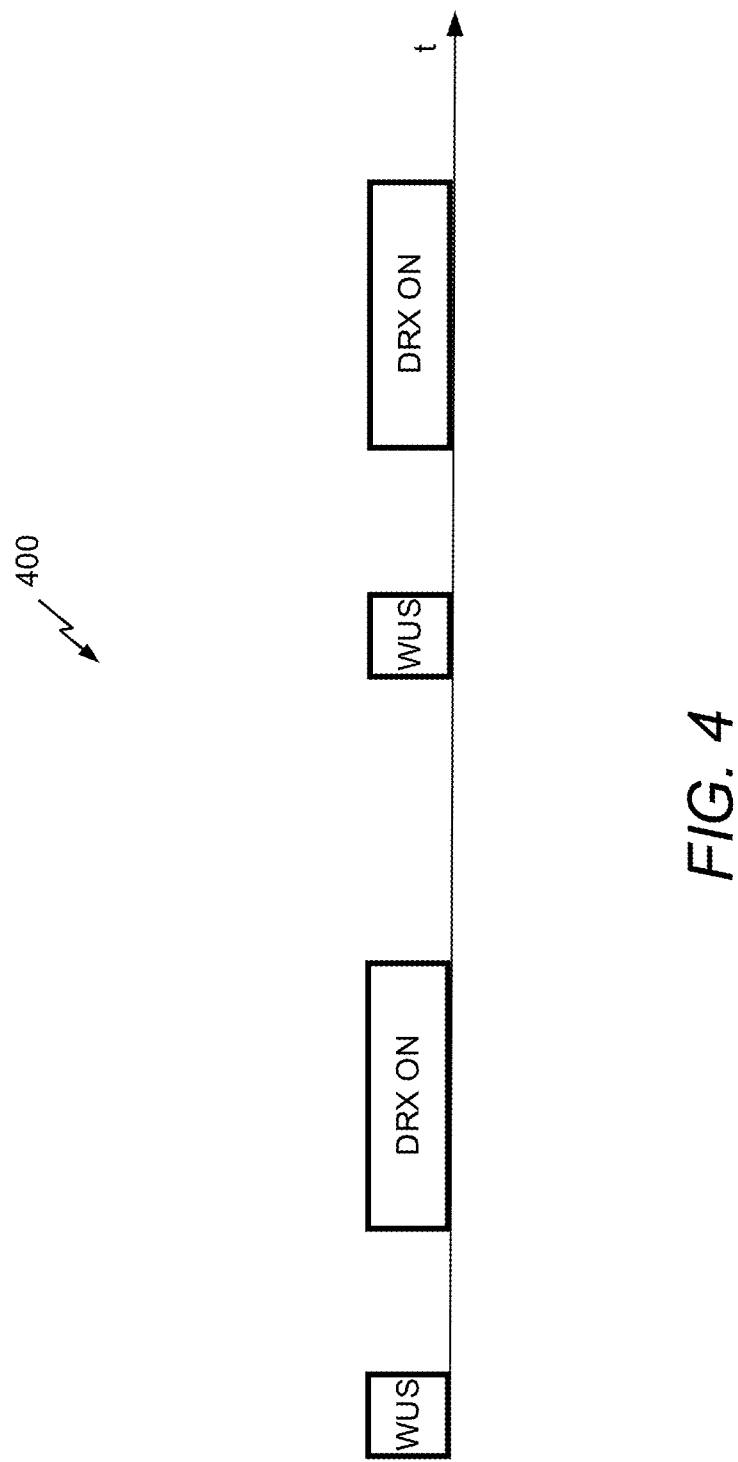

COMMUNICATION OF WUS INDICATING SELECTED PCIS OF A PCI GROUP

CROSS-REFERENCE TO RELATED APPLICATION

The present application for patent claims the benefit of U.S. Provisional Application No. 63/015,230, entitled "WAKE-UP SIGNALS AND DORMANCY STATUS SIGNALS FOR SELECTED PHYSICAL CHANNEL IDENTIFIERS", filed Apr. 24, 2020, assigned to the assignee hereof and hereby expressly incorporated by reference herein in its entirety.

BACKGROUND OF THE DISCLOSURE

1. Field of the Disclosure

Aspects of the disclosure relate generally to wireless communications and to techniques and apparatuses related to wake-up signals and dormancy status signals for selected physical channel identifiers (PCIs).

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WIMAX). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In 3GPP Rel. 16, a wake-up signal (WUS) was introduced and carried by DCI format 2_6, which is monitored by a UE in a designated occasion before each configured discontinuous reception (DRX) ON duration. In 3GPP Rel. 16, the WUS includes a UE-specific indication per PCI as to whether the UE should wake up for a next configured DRX ON duration.

In 3GPP Rel. 17, L1/L2-based inter-cell mobility is introduced, whereby UEs may be served by the RAN in one of two modes, characterized as follows:

Mode 1: Each serving cell of the UE has multiple TRPs, which can be at different locations. Each TRP may have a different PCI (e.g., indicated by SSB from the respective TRP). The UE may be served by a subset of the serving cell's TRPs, which can change over time via DCI or MAC-CE signaling (e.g., TRPs #1 and #2 at time 1, TRPs #2, #3 and #4 at time 2, etc.), and Mode 2: UE is configured with a group of serving cells with a single PCI per serving cell. UE is configured to measure L1 metrics per serving cell in the group (e.g., L1-RSRP/SINR/RSRQ). The UE may be served by a subset of the serving cells, which can change over time via DCI or MAC-CE signaling (e.g., cell #1 and #2 at time 1, cells #2, #3 and #4 at time 2, etc.). A base station (e.g., a gNB associated with one or more of the serving cells) determines the subset based on an L1 measurement report from the UE that is transmitted to either particular selected serving cells or to an anchor serving cell among the group of serving cells.

Since WUS is conventionally transmitted per-PCI in 3GPP Rel. 16, a separate WUS needs to be transmitted for each PCI for UEs operating in accordance with Mode 1 or Mode 2 as noted above, which increases interference, system overhead and power consumption at the UE. Embodiments of the disclosure are thereby directed to a WUS that provide a wake-up indication for selected PCIs of a PCI group, which provides various technical advantages, such as reducing interference, system overhead and power consumption at the UE.

In an aspect of the disclosure, a method, a computer-readable medium, and an apparatus are provided. The apparatus may be a UE. The UE may receive a wake-up signal (WUS) that includes an indication of selected physical cell identifiers (PCIs) of a PCI group, and monitor, in response to the WUS, one or more configured DRX ON durations associated with the selected PCIs of the PCI group.

In another aspect of the disclosure, a method, a computer-readable medium, and an apparatus are provided. The apparatus may be a base station. The base station may transmit, to a user equipment (UE), a wake-up signal (WUS) that includes an indication of selected physical cell identifiers (PCIs) of a PCI group, and transmit, to the UE based on the WUS, on one or more configured DRX ON durations associated with the selected PCIs of the PCI group.

In 3GPP Rel. 16, WUS also indicates dormancy status information per configured secondary cell (SCell) group per UE. In particular, if the WUS indicates the SCell group to be in dormant state, each activated SCell in the corresponding group will transition to its dormant BWP, for which no PDCCH monitoring is performed to save power at the UE. Alternatively, the SCell group is indicated to be in a non-dormant state, each activated SCell in the corresponding group will transition to its first non-dormant BWP, which has PDCCH monitoring for active communications Since WUS is conventionally transmitted per-PCI in 3GPP Rel. 16, a separate indication of dormancy status via WUS needs to be transmitted for the SCell group of each PCI for UEs operating as noted above, which increases interference, system overhead and power consumption at the UE. Embodiments of the disclosure are thereby directed to a WUS that provide dormancy status information for a selected set of PCIs, which provides various technical advantages, such as reducing interference, system overhead and power consumption at the UE.

In an aspect of the disclosure, a method, a computer-readable medium, and an apparatus are provided. The apparatus may be a UE. The UE may receive a signal that includes dormancy status information for a set of selected physical cell identifiers (PCIs). for each PCI in the set of selected PCIs indicated by the dormancy status information as associated with a dormant state, refraining from Physical Downlink Control Channel (PDCCH) monitoring on a dormant bandwidth part (BWP) to which the respective PCI transitions. For each PCI in the set of selected PCIs indicated by the dormancy status information as associated with a non-dormant state, performing PDCCH monitoring on a non-dormant BWP to which the respective PCI transitions.

In another aspect of the disclosure, a method, a computer-readable medium, and an apparatus are provided. The apparatus may be a base station. The base station may transmit, to a user equipment (UE), a signal that includes dormancy status information for a set of selected physical cell identifiers (PCIs). For each PCI in the set of selected PCIs indicated by the dormancy status information as associated with a dormant state, transitioning the respective PCI to a dormant bandwidth part (BWP) without PDCCH communications targeted to the UE. For each PCI in the set of selected PCIs indicated by the dormancy status information as associated with a non-dormant state, transitioning the respective PCI to a non-dormant BWP with PDCCH communications targeted to the UE.

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 4 illustrates a discontinuous reception (DRX) sequence according to an aspect of the disclosure.

DETAILED DESCRIPTION

Figure 1:
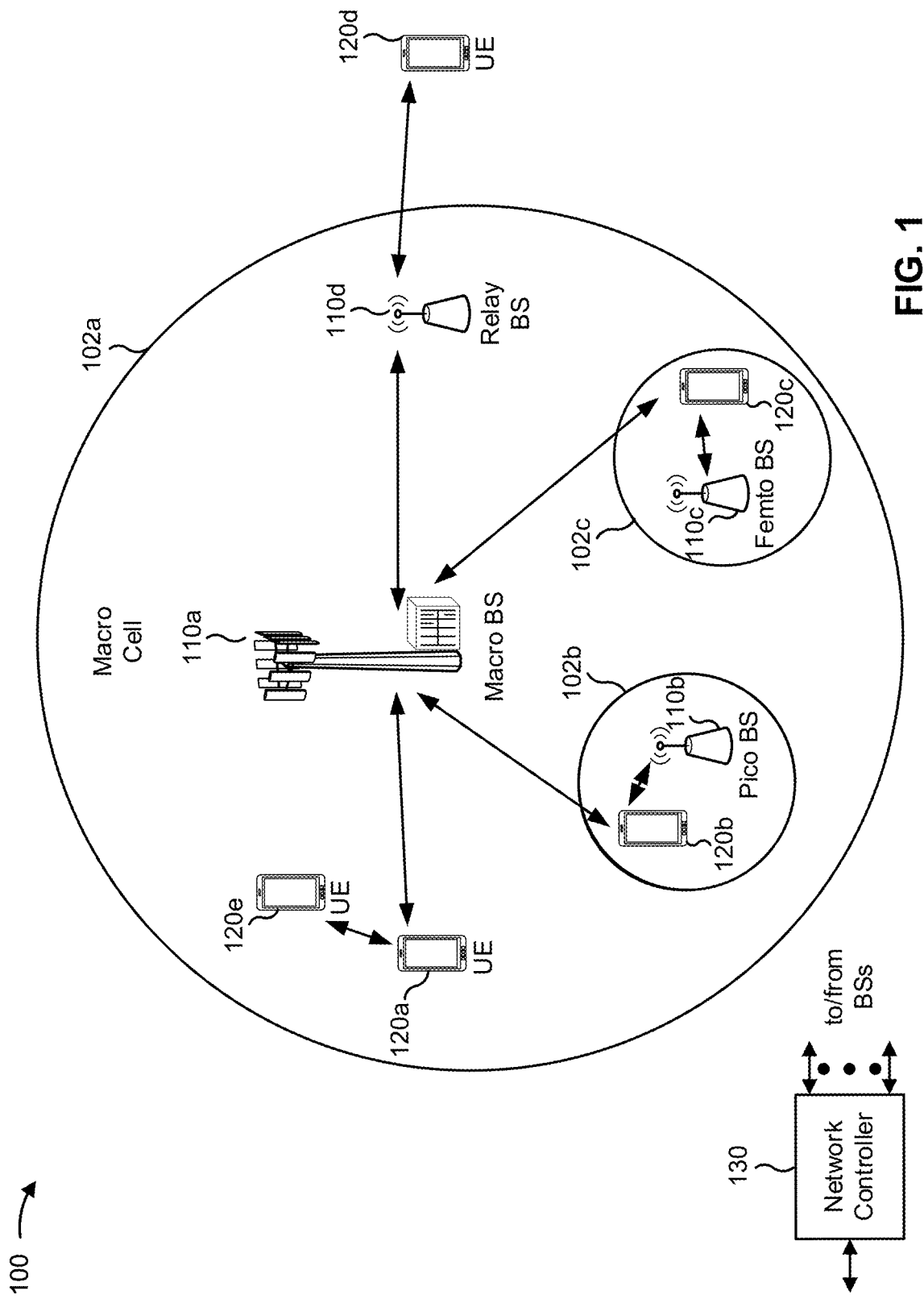
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
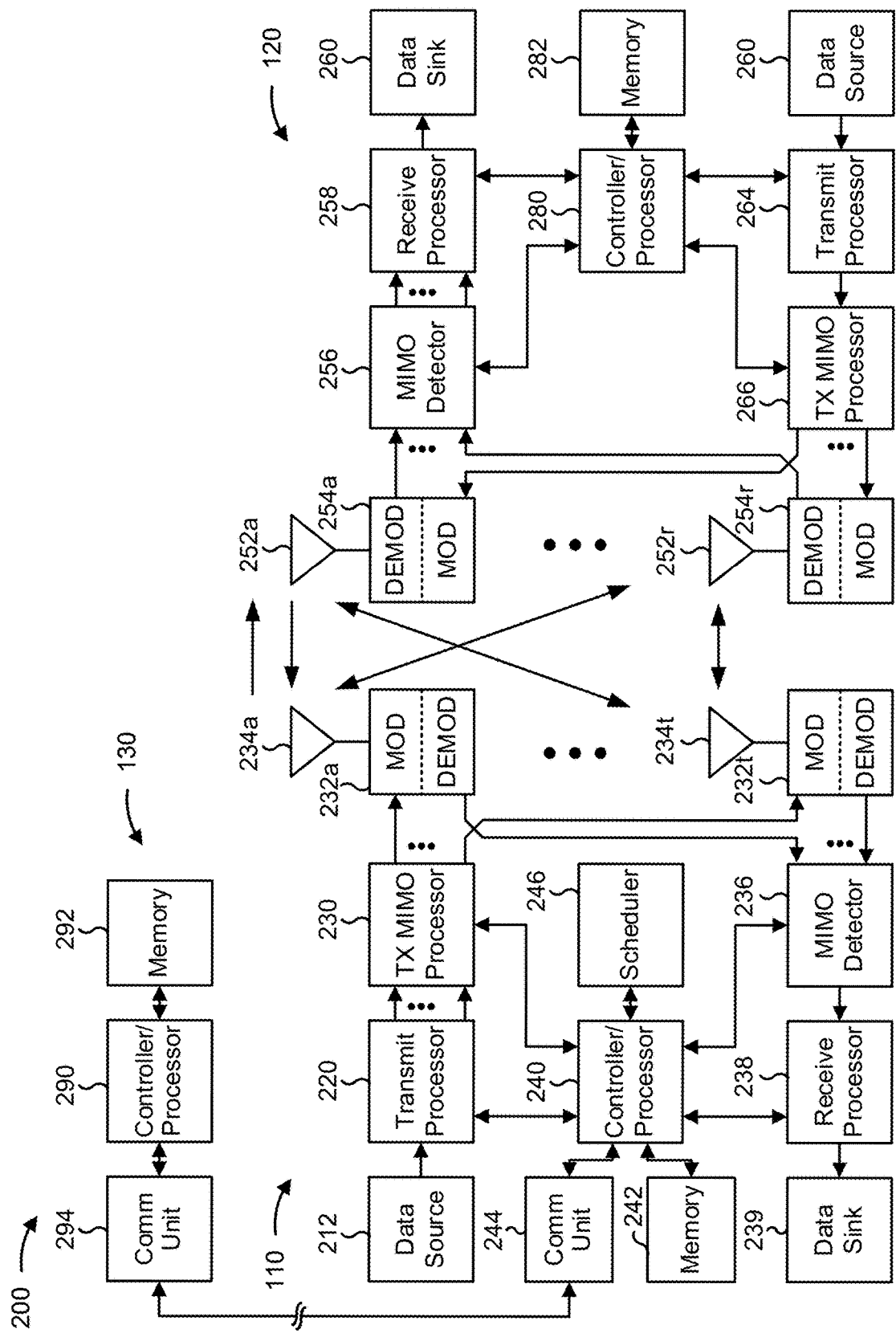
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3A:
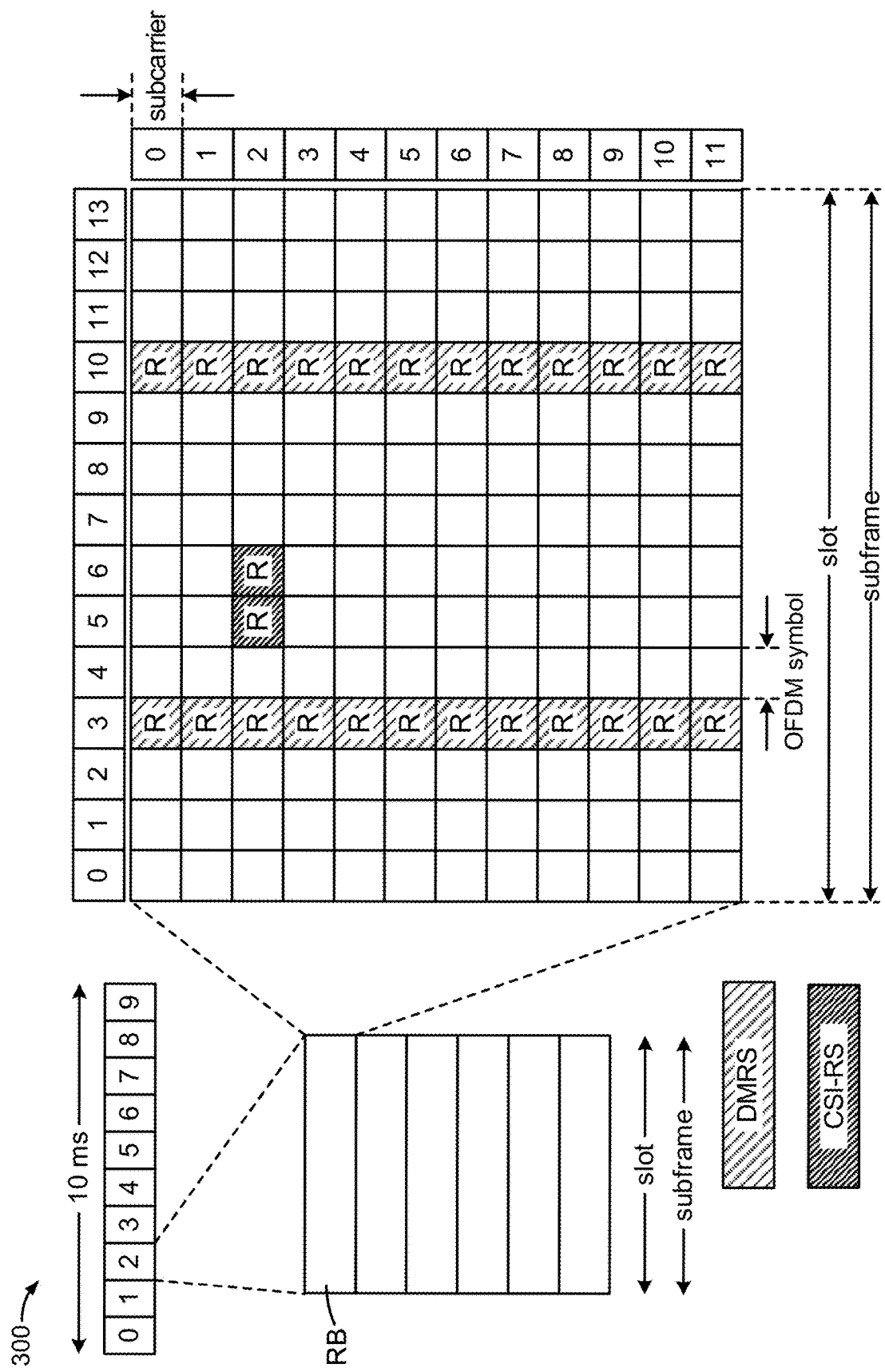
FIG. 3A is a diagram illustrating an example of a DL frame structure, according to aspects of the disclosure.
Figure 3B:
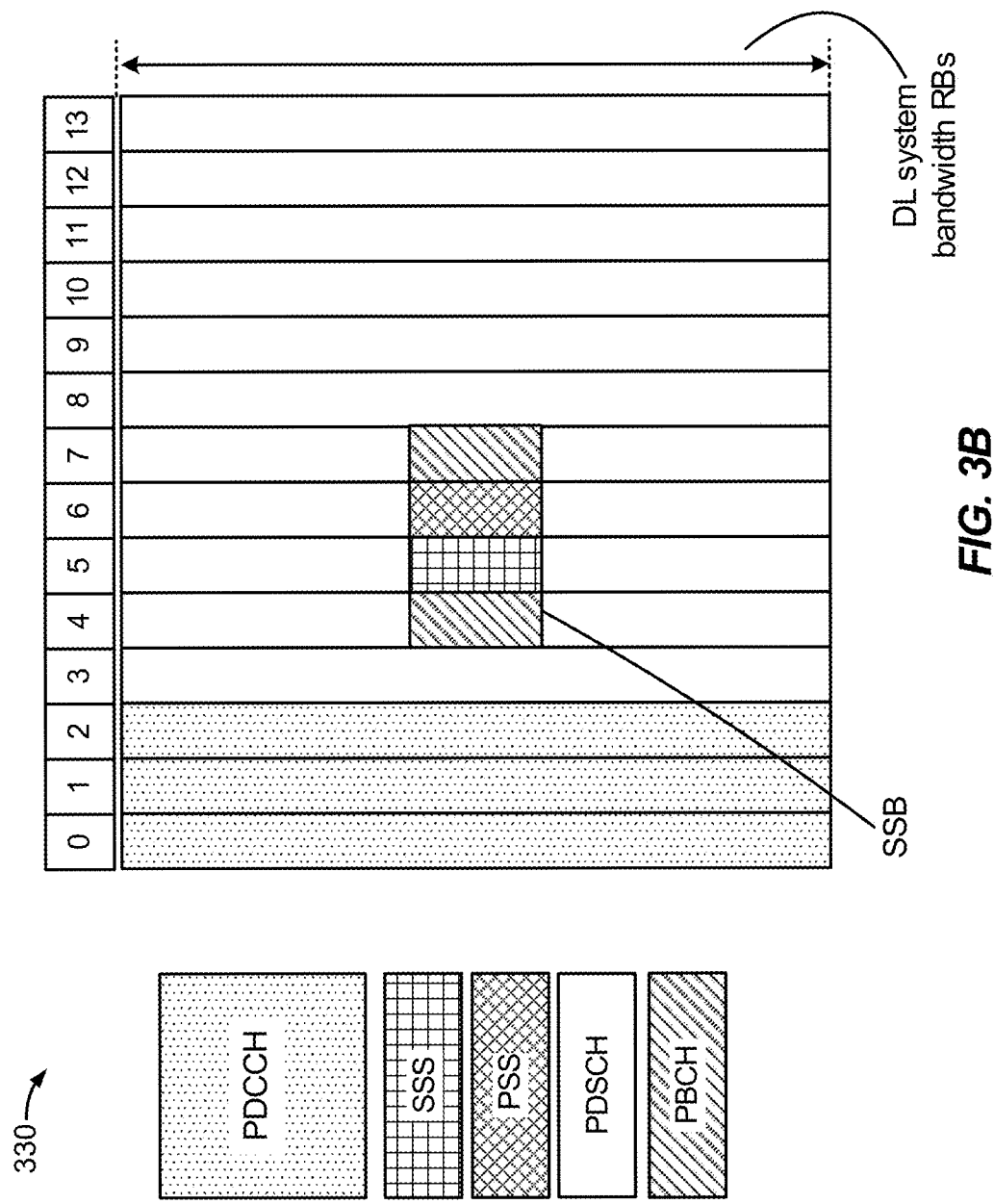
FIG. 3B is a diagram illustrating an example of channels within the DL frame structure, according to aspects of the disclosure.

FIG. 3A is a diagram 300 illustrating an example of a DL frame structure, according to aspects of the disclosure. FIG. 3B is a diagram 330 illustrating an example of channels within the DL frame structure, according to aspects of the disclosure. Other wireless communications technologies may have a different frame structures and/or different channels.

In some cases, NR may utilize OFDM on the downlink and single-carrier frequency division multiplexing (SC-FDM) on the uplink. In other cases, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 3, 8, or 16 subbands for system bandwidth of 1.25, 2.5, 5, 10, or 20 MHz, respectively.

NR may support multiple numerologies, for example, subcarrier spacing of 15 kHz, 30 kHz, 60 kHz, 120 kHz and 240 kHz or greater may be available. Table 1 provided below lists some various parameters for different NR numerologies.

TABLE 1

| Sub-carrier spacing (kHz) | Symbols/slot | slots/subframe | slots/frame | slot duration (ms) | Symbol duration (µs) | Max. nominal system BW (MHz) with 3K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 3A and 3B, a numerology of 15 kHz is used. Thus, in the time domain, a frame (e.g., 10 ms) is divided into 10 equally sized subframes of 1 ms each, and each subframe includes one time slot. In FIGS. 3A and 3B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 3A and 3B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 3A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 3A.

FIG. 3B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

In 3GPP Rel. 16, a wake-up signal (WUS) was introduced and carried by DCI format 2_6, which is monitored by a UE in a designated occasion before each configured discontinuous reception (DRX) ON duration, as shown in FIG. 4 via DRX sequence 400. In 3GPP Rel. 16, the WUS includes a UE-specific indication per PCI as to whether the UE should wake up for a next configured DRX ON duration.

In 3GPP Rel. 17, L1/L2-based inter-cell mobility is introduced, whereby UEs may be served by the RAN in one of two modes, characterized as follows:

Mode 1: Each serving cell of the UE has multiple TRPs, which can be at different locations. Each TRP may have a different PCI (e.g., indicated by SSB from the respective TRP). The UE may be served by a subset of the serving cell's TRPs, which can change over time via DCI or MAC-CE signaling (e.g., TRPs #1 and #2 at time 1, TRPs #2, #3 and #4 at time 2, etc.), and Mode 2: UE is configured with a group of serving cells with a single PCI per serving cell. UE is configured to measure L1 metrics per serving cell in the group (e.g., L1-RSRP/SINR/RSRQ). The UE may be served by a subset of the serving cells, which can change over time via DCI or MAC-CE signaling (e.g., cell #1 and #2 at time 1, cells #2, #3 and #4 at time 2, etc.). A base station (e.g., a gNB associated with one or more of the serving cells) determines the subset based on an L1 measurement report from the UE that is transmitted to either particular selected serving cells or to an anchor serving cell among the group of serving cells.

Since WUS is conventionally transmitted per-PCI in 3GPP Rel. 16, a separate WUS needs to be transmitted for each PCI for UEs operating in accordance with Mode 1 or Mode 2 as noted above, which increases interference, system overhead and power consumption at the UE. Embodiments of the disclosure are thereby directed to a WUS that provide a wake-up indication for selected PCIs of a PCI group, which provides various technical advantages, such as reducing interference, system overhead and power consumption at the UE.

Figure 5:
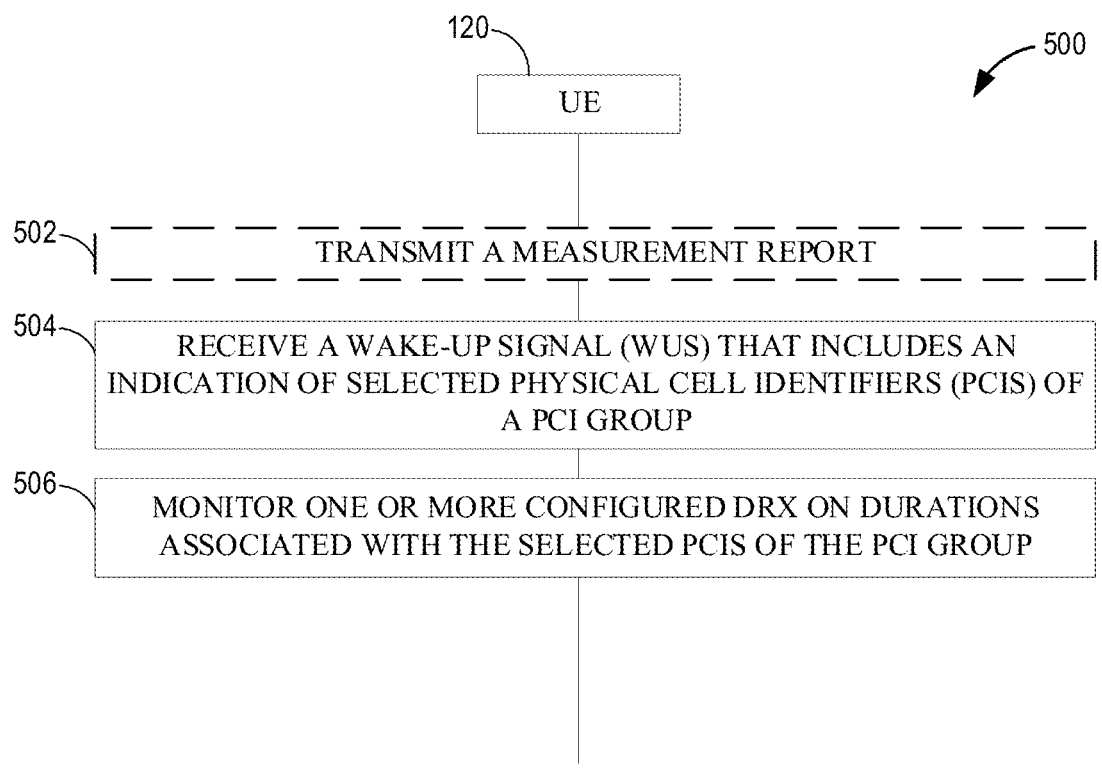
FIG. 5 illustrates an exemplary process of wireless communications according to an aspect of the disclosure.

FIG. 5 illustrates an exemplary process 500 of wireless communications according to an aspect of the disclosure. The process 500 of FIG. 5 is performed by UE 120.

At 502, UE 120 (e.g., antenna(s) 252a . . . 252r, modulators 254a . . . 254r, Tx MIMO processor 266, transmit processor 264, etc.) optionally transmits a measurement report associated with a configured DRX ON duration that precedes a WUS, such as the WUS received at 504 (described below). In some designs, this optional measurement report may be used by a base station to select PCI(s) to be included in a PCI group. In some designs, the measurement report may comprise L1 metrics, including but not limited to L1-RSRP, L1-SINR, L1-RSRQ, or any combination thereof. In a further example, the measurement report may be a periodic (P) measurement report, a semi-periodic (SP) measurement report, or an aperiodic (AP) measurement report.

At 504, UE 120 (e.g., antenna(s) 252a . . . 252r, MIMO detector 256, receive processor 258, etc.) a wake-up signal (WUS) that includes an indication of selected PCIs of a PCI group. For example, if UE 120 is operating in accordance with Mode 1 as described above, the PCI group may be associated with all candidate transmission reception points (TRPs) of a single serving cell (e.g., with the selected PCIs mapping to a subset of the TRPs for that single serving cell). In another example, if UE 120 is operating in accordance with Mode 2 as described above, the PCI group may be associated with a plurality of candidate serving cells (e.g., with the selected PCIs mapping to a subset of the candidate serving cells). In an example, the selected PCIs indicated by the WUS at 504 may be selected by a base station based on the optional measurement report from 502.

At 506, UE 120 (e.g., antenna(s) 252a . . . 252r, MIMO detector 256, receive processor 258, etc.) monitors, in response to the WUS from 504, one or more configured DRX ON durations associated with the selected PCIs of the PCI group. The particular DRX ON duration(s) for which the UE 120 monitors at 506 is configurable. For example, the one or more DRX ON durations may comprise (i) the next configured DRX ON duration subsequent to the WUS, (ii) the next N configured DRX ON durations subsequent to the WUS, N being an integer that is greater than or equal to 2, (iii) each subsequent configured DRX ON duration subsequent to the WUS until instructed otherwise, and/or (iv) a designated set of configured DRX ON durations configured by the base station. Any of (i)-(iv) may be dynamically configured via the WUS or other signaling (e.g., RRC, MAC-CE, DCI, etc.). Alternatively, any of (i)-(iv) may be pre-defined.

Figure 6:
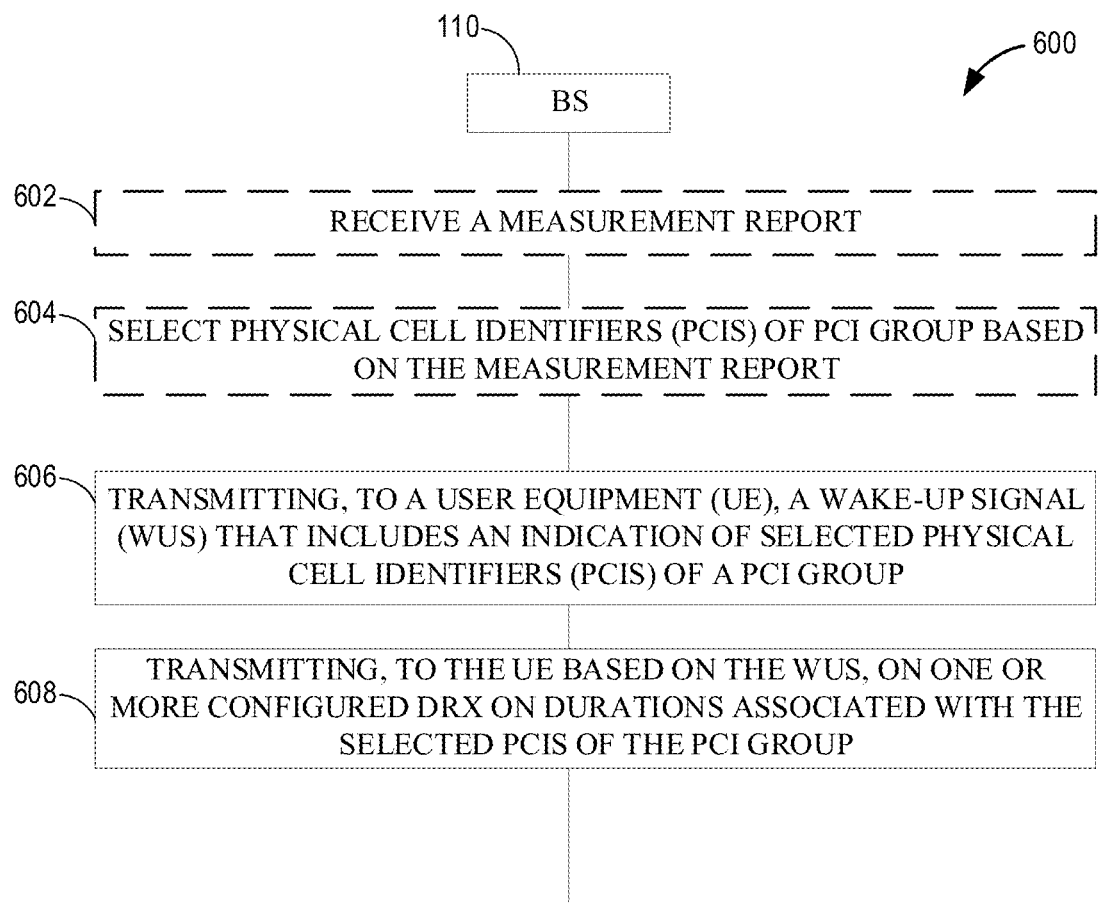
FIG. 6 illustrates an exemplary process of wireless communications according to another aspect of the disclosure.

FIG. 6 illustrates an exemplary process 600 of wireless communications according to an aspect of the disclosure. The process 600 of FIG. 6 is performed by BS 110.

At 602, BS 110 (e.g., antenna(s) 234a . . . 234r, MIMO detector 236, receive processor 238, etc.) optionally receives a measurement report associated with a configured DRX ON duration that precedes a WUS, such as the WUS transmitted at 606 (described below). In some designs, the measurement report may comprise L1 metrics, including but not limited to L1-RSRP, L1-SINR, L1-RSRQ, or any combination thereof. In a further example, the measurement report may be a periodic (P) measurement report, a semi-periodic (SP) measurement report, or an aperiodic (AP) measurement report.

At 604, BS 110 (e.g., controller/processor 240, etc.) optionally selects PCIs from a PCI group based on the measurement report. For example, if UE 120 is operating in accordance with Mode 1 as described above, the PCIs may be selected from a PCI group that comprises all candidate TRPs of a single serving cell. In another example, if UE 120 is operating in accordance with Mode 2 as described above, the PCIs may be selected from a PCI group that comprises a plurality of candidate serving cells. In some designs, the measurement report is used to select the PCIs which can provide the best service to the UE.

At 606, BS 110 (e.g., antenna(s) 234a . . . 234r, modulators 232a . . . 232t, Tx MIMO processor 220, processor 220, etc.) transmits a wake-up signal (WUS) that includes an indication of selected PCIs of a PCI group. For example, if UE 120 is operating in accordance with Mode 1 as described above, the PCI group may be associated with all candidate TRPs of a single serving cell (e.g., with the selected PCIs mapping to a subset of the TRPs for that single serving cell). In another example, if UE 120 is operating in accordance with Mode 2 as described above, the PCI group may be associated with a plurality of candidate serving cells (e.g., with the selected PCIs mapping to a subset of the candidate serving cells). In an example, the selected PCIs indicated by the WUS at 606 may be selected by BS 110 at 604 based on the optional measurement report from 602.

At 608, BS 110 (e.g., antenna(s) 234a . . . 234r, modulators 232a . . . 232t, Tx MIMO processor 220, processor 220, etc.) transmits, to the UE based on the WUS, on one or more configured DRX ON durations associated with the selected PCIs of the PCI group. The particular DRX ON duration(s) on which BS 110 transmits to the UE at 608 is configurable. For example, the one or more DRX ON durations may comprise (i) the next configured DRX ON duration subsequent to the WUS, (ii) the next N configured DRX ON durations subsequent to the WUS, N being an integer that is greater than or equal to 2, (iii) each subsequent configured DRX ON duration subsequent to the WUS until instructed otherwise, and/or (iv) a designated set of configured DRX ON durations configured by the base station. Any of (i)-(iv) may be dynamically configured via the WUS or other signaling (e.g., RRC, MAC-CE, DCI, etc.). Alternatively, any of (i)-(iv) may be pre-defined.

Figure 7:
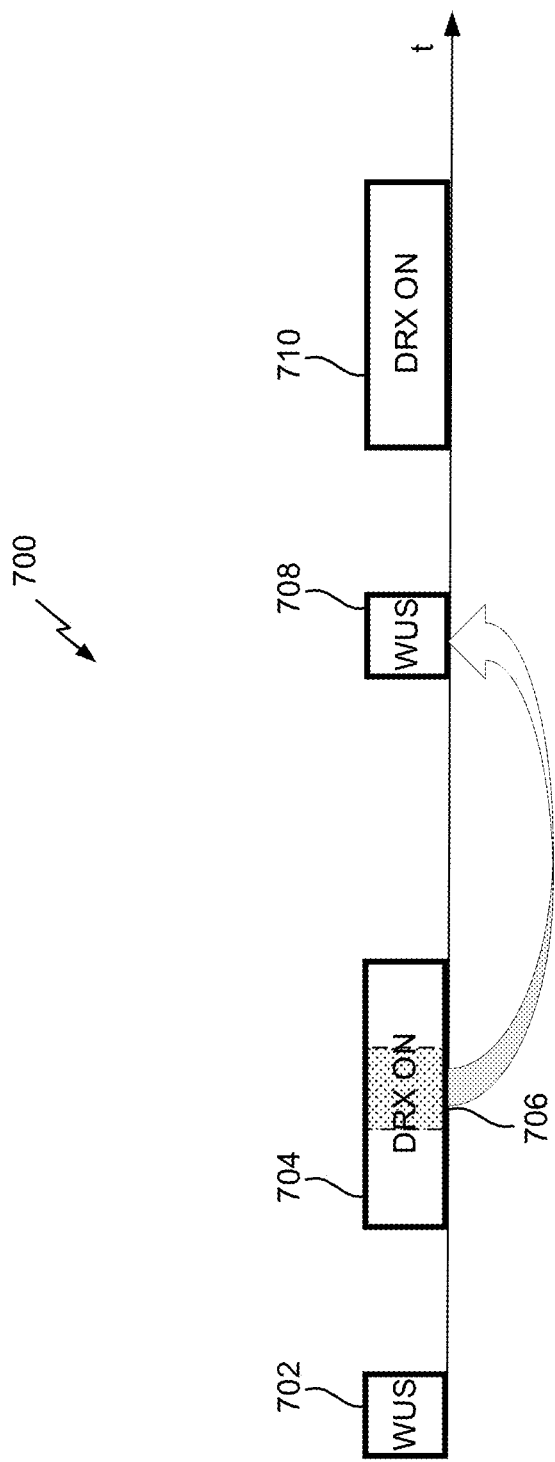
FIG. 7 illustrates a DRX sequence according to an aspect of the disclosure.

FIG. 7 illustrates a DRX sequence 700 based on an example implementation of the processes 500-600 of FIGS. 5-6 in accordance with an embodiment of the disclosure. In FIG. 7, UE 120 receives a first WUS 702 from BS 110, which instructs UE 120 to monitor at least part of a first configured DRX ON duration 704. During the first configured DRX ON duration 704, UE 120 transmits a measurement report to BS 110 at 706. BS 110 receives the measurement report at 706, and uses the measurement report to select PCI(s) from a PCI group. UE 120 receives a second WUS 708 from BS 110 which indicates the selected PCI(s) from the PCI group, which instructs UE 120 to monitor at a second configured DRX ON duration 710 in association with BWPs of the selected PCI(s) indicated via the second WUS 708.

In 3GPP Rel. 16, WUS also indicates dormancy status information per configured secondary cell (SCell) group per UE. In particular, if the WUS indicates the SCell group to be in dormant state, each activated SCell in the corresponding group will transition to its dormant BWP, for which no PDCCH monitoring is performed to save power at the UE. Alternatively, the SCell group is indicated to be in a non-dormant state, each activated SCell in the corresponding group will transition to its first non-dormant BWP, which has PDCCH monitoring for active communications Since WUS is conventionally transmitted per-PCI in 3GPP Rel. 16, a separate indication of dormancy status via WUS needs to be transmitted for the SCell group of each PCI for UEs operating as noted above, which increases interference, system overhead and power consumption at the UE. Embodiments of the disclosure are thereby directed to a WUS that provide dormancy status information for a selected set of PCIs, which provides various technical advantages, such as reducing interference, system overhead and power consumption at the UE.

Figure 8:
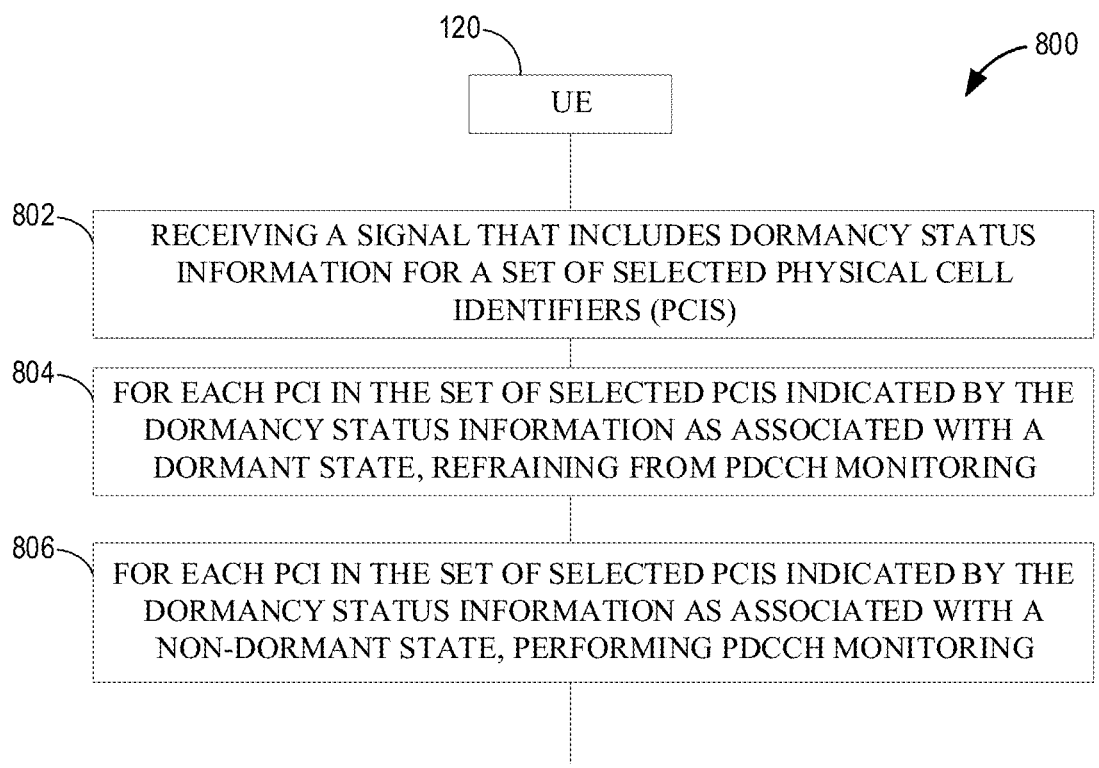
FIG. 8 illustrates an exemplary process of wireless communications according to an aspect of the disclosure.

FIG. 8 illustrates an exemplary process 800 of wireless communications according to an aspect of the disclosure. The process 800 of FIG. 8 is performed by UE 120.

At 802, UE 120 (e.g., antenna(s) 252a . . . 252r, MIMO detector 256, receive processor 258, etc.) receives a signal that includes dormancy status information for a set of selected physical cell identifiers (PCIs). In some designs, the signal may be received in a DCI communication in a search space monitored by the UE outside of an active time (e.g., a WUS). In other designs, the signal may be received in a DCI communication in a search space monitored by the UE inside of an active time (e.g., with the dormancy status information being conveyed via a modification to DCI format 1_1 or 0_1 for UE-specific traffic scheduling).

At 804, for each PCI in the set of selected PCIs indicated by the dormancy status information as associated with a dormant state, UE 120 (e.g., antenna(s) 252a . . . 252r, MIMO detector 256, receive processor 258, controller/processor 280, etc.) refrains from Physical Downlink Control Channel (PDCCH) monitoring on a dormant bandwidth part (BWP) to which the respective PCI transitions. In some designs, even though PDCCH monitoring is not performed on the dormant BWP, the respective PCI(s) may transmit other non-traffic information on the dormant BWP (e.g., to maintain synchronization, power control, etc.). In some cases, zero PCIs, a subset of PCIs, or all PCIs in the set of selected PCIs may be indicated by the dormancy status information as associated with the dormant state. Moreover, in some designs, the set of selected PCIs may itself correspond to a subset of a larger candidate PCI group. For example, the PCI group may be associated with all candidate TRPs of a single serving cell (e.g., Mode 1), the PCI group may be associated with TRPs associated with a plurality of candidate serving cells, or a combination thereof.

At 806, for each PCI in the set of selected PCIs indicated by the dormancy status information as associated with a non-dormant state, UE 120 (e.g., antenna(s) 252a . . . 252r, MIMO detector 256, receive processor 258, controller/processor 280, etc.) performs PDCCH monitoring on a non-dormant BWP to which the respective PCI transitions. For example, the non-dormant BWP may comprise a first non-dormant BWP subsequent to the signal from 802. In some cases, zero PCIs, a subset of PCIs, or all PCIs in the set of selected PCIs may be indicated by the dormancy status information as associated with the non-dormant state.

Figure 9:
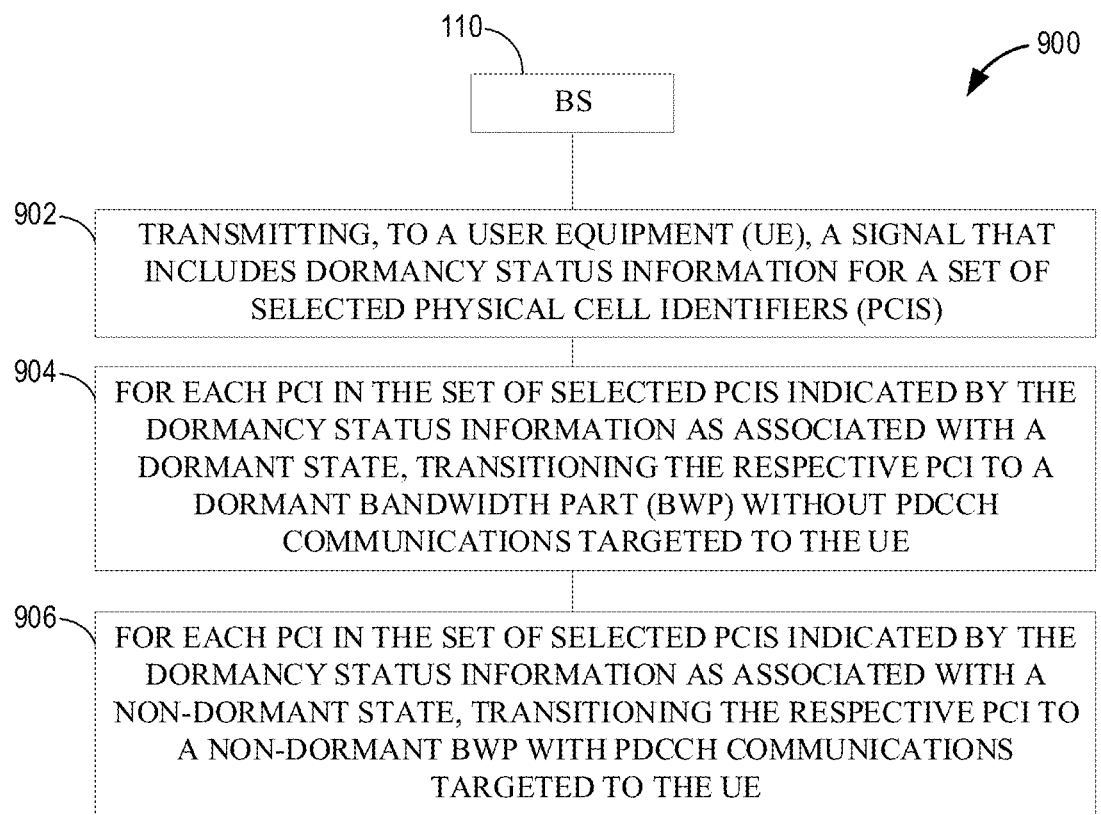
FIG. 9 illustrates an exemplary process of wireless communications according to another aspect of the disclosure.

FIG. 9 illustrates an exemplary process 900 of wireless communications according to an aspect of the disclosure. The process 900 of FIG. 9 is performed by BS 110.

At 902, BS 110 (e.g., antenna(s) 234a . . . 234r, modulators 232a . . . 232t, Tx MIMO processor 220, processor 220, etc.) transmits, to a UE, a signal that includes dormancy status information for a set of selected PCIs. In some designs, the signal may be received in a DCI communication in a search space monitored by the UE outside of an active time (e.g., a WUS). In other designs, the signal may be received in a DCI communication in a search space monitored by the UE inside of an active time (e.g., with the dormancy status information being conveyed via a modification to DCI format 1_1 or 0_1 for UE-specific traffic scheduling).

At 904, for each PCI in the set of selected PCIs indicated by the dormancy status information as associated with a dormant state, BS 110 (e.g., antenna(s) 234a . . . 234r, modulators 232a . . . 232t, Tx MIMO processor 220, processor 220, etc.) transitions the respective PCI to a dormant bandwidth part (BWP) without PDCCH communications targeted to the UE. In some designs, even though PDCCH communications are not targeted to the UE on the dormant BWP, the respective PCI(s) may transmit other non-traffic information on the dormant BWP (e.g., to maintain synchronization, power control, etc.). In some cases, zero PCIs, a subset of PCIs, or all PCIs in the set of selected PCIs may be indicated by the dormancy status information as associated with the dormant state. Moreover, in some designs, the set of selected PCIs may itself correspond to a subset of a larger candidate PCI group. For example, the PCI group may be associated with all candidate TRPs of a single serving cell (e.g., Mode 1), the PCI group may be associated with TRPs associated with a plurality of candidate serving cells, or a combination thereof.

At 906, for each PCI in the set of selected PCIs indicated by the dormancy status information as associated with a non-dormant state, BS 110 (e.g., antenna(s) 234a . . . 234r, modulators 232a . . . 232t, Tx MIMO processor 220, processor 220, etc.) transitions the respective PCI to a non-dormant BWP with PDCCH communications targeted to the UE. For example, the non-dormant BWP may comprise a first non-dormant BWP subsequent to the signal from 906. In some cases, zero PCIs, a subset of PCIs, or all PCIs in the set of selected PCIs may be indicated by the dormancy status information as associated with the non-dormant state.

Figure 10:
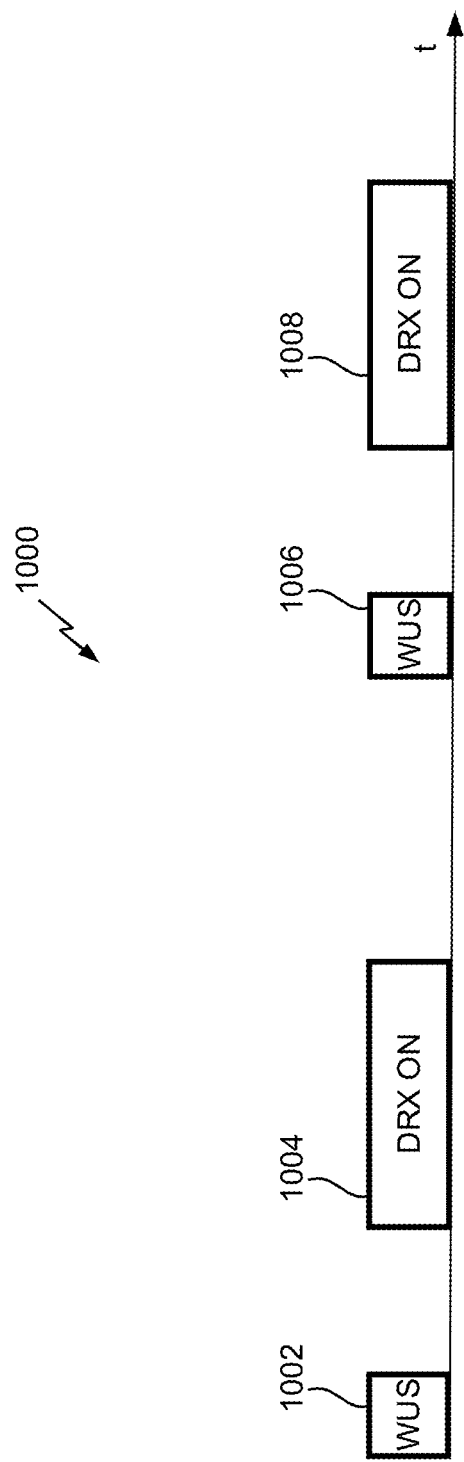
FIG. 10 illustrates a DRX sequence according to an aspect of the disclosure.

FIG. 10 illustrates a DRX sequence 1000 based on an example implementation of the processes 800-900 of FIGS. 8-9 in accordance with an embodiment of the disclosure. In FIG. 10, UE 120 receives a first WUS 1002 from BS 110, which instructs UE 120 to monitor at least part of a first configured DRX ON duration 1004. BS 110 determines a dormancy status for selected PCI(s), and indicates the dormancy status of the selected PCI(s) via a second WUS 1006. At 1008, UE 120 then monitors a dormant BWP or a non-dormant BWP associated with the selected PCI(s) in accordance with the indicated dormancy status information for the selected PCI(s) during a next configured DRX ON duration.

Referring to FIGS. 8-10, in an example, the dormancy status information for each selected PCI in the set of selected PCIs may be indicated explicitly per selected PCI. For example, assume that two PCIs are selected to serve the UE. In this case, two bits in the signal at 802 or 902 may be used to signal dormancy states for these two PCIs (e.g., one bit specifies dormant state or non-dormant state for PCI 1, and the other bit specifies dormant state or non-dormant state for PCI 2). In another example, the dormancy status information for each selected PCI in the set of selected PCIs is indicated implicitly per PCI group. For example, the PCI group may correspond to a single serving cell in Mode 1 (e.g., a group of TRPs for one serving cell) or to multiple serving cells in Mode 2. In this case, the dormancy status information can be configured to apply to each selected PCI in the PCI group (e.g., via a single bit, rather than one bit per PCI).

While examples above describe UEs which are operable in Mode 1 or Mode 2, in other designs a hybrid Mode 1+2 may be implemented whereby a PCI group comprises multiple cells as well as multiple TRPs per cell for at least one of the multiple cells. Hence, PCI groups are not limited to operation in accordance with Mode 1 only or Mode 2 only.

Figure 11:
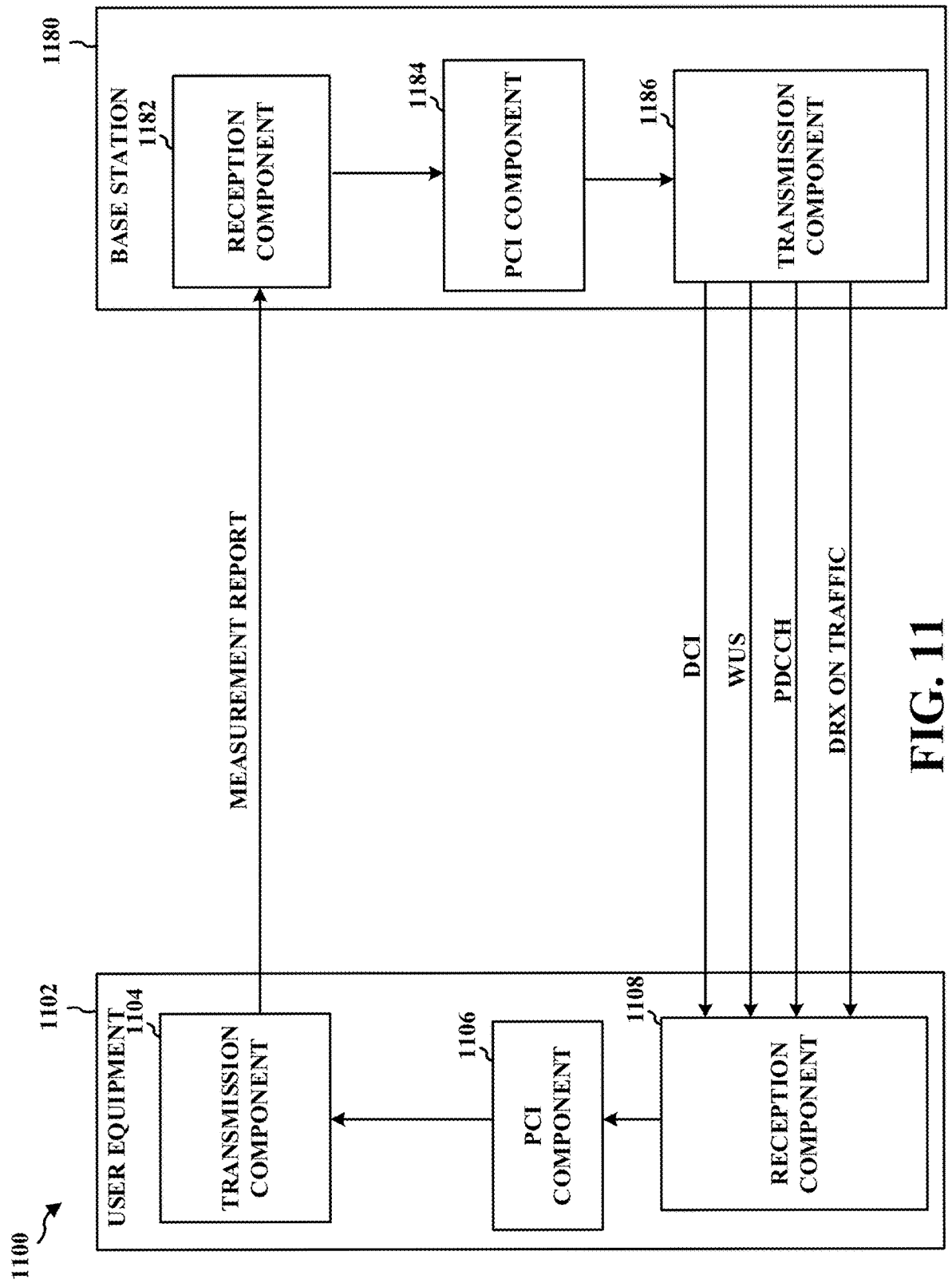
FIG. 11 is a conceptual data flow diagram illustrating the data flow between different means/components in exemplary apparatuses in accordance with an embodiment of the disclosure.

FIG. 11 is a conceptual data flow diagram 1100 illustrating the data flow between different means/components in exemplary apparatuses 1102 and 1180 in accordance with an embodiment of the disclosure. The apparatus 1102 may be a UE (e.g., UE 120) in communication with an apparatus 1180, which may be a base station (e.g., base station 110).

The apparatus 1102 includes a transmission component 1104, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 1102 further includes PCI component 1106, which may correspond to processor circuitry in UE 120 as depicted in FIG. 2, including controller/processor 280, etc. The apparatus 1102 further includes a reception component 1108, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 1180 includes a reception component 1182, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 1180 further includes a PCI component 1184, which may correspond to processor circuitry in BS 110 as depicted in FIG. 2, including controller/processor 240. The apparatus 1180 further includes a transmission component 1186, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 11, the transmission component 1104 transmits a measurement report to the reception component 1182, which forwards the measurement report to PCI component 1184. The PCI component 1184 selects PCI(s) based on the measurement report. The selected PCI(s) may be indicated in association with a WUS, dormancy status information, or a combination thereof. The transmission component 1186 transmits downlink data to the reception component 1108, including DCI communications, WUSs, PDCCH communications, DRX ON traffic, or a combination thereof. Some or all of these communications may be measured and reported back to the apparatus 1180 via the measurement report. Some or all of these communications may convey the selected PCI(s), and the PCI component 1106 can process such signals with respect to the selected PCI(s) rather than in a PCI-specific manner where a single signal is limited to application to a single PCI.

One or more components of the apparatus 1102 and apparatus 1180 may perform each of the blocks of the algorithm in the aforementioned flowcharts of FIG. 4-6 or 8-9. As such, each block in the aforementioned flowcharts of FIG. 4-6 or 8-9 may be performed by a component and the apparatus 1102 and apparatus 1180 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
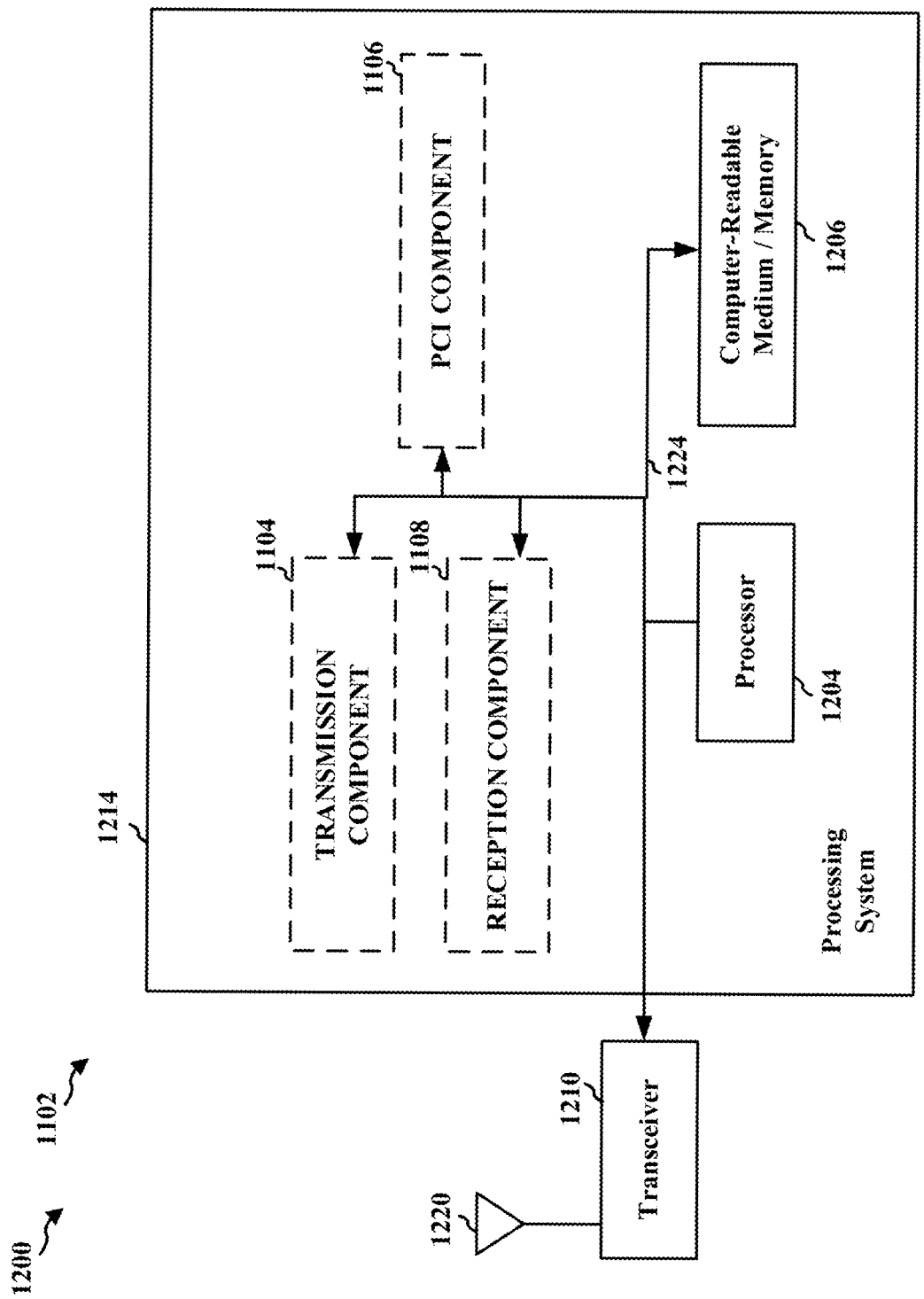
FIG. 12 is a diagram illustrating an example of a hardware implementation for an apparatus employing a processing system.

FIG. 12 is a diagram 1200 illustrating an example of a hardware implementation for an apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106 and 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1108. In addition, the transceiver 1210 receives information from the processing system 1214, specifically the transmission component 1104, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106 and 1108. The components may be software components running in the processor 1204, resident/stored in the computer readable medium/memory 1206, one or more hardware components coupled to the processor 1204, or some combination thereof. The processing system 1214 may be a component of the UE 120 of FIG. 2 and may include the memory 282, and/or at least one of the TX processor 264, the RX processor 258, and the controller/processor 280.

In one configuration, the apparatus 1102 (e.g., a UE) for wireless communication includes means for receiving a wake-up signal (WUS) that includes an indication of selected physical cell identifiers (PCIs) of a PCI group, and means for monitoring, in response to the WUS, one or more configured DRX ON durations associated with the selected PCIs of the PCI group. The apparatus 1102 for wireless communication further optionally includes means for transmitting a measurement report associated with a configured DRX ON duration that precedes the WUS, wherein the selected PCIs of the PCI group are based on the measurement report.

In another configuration, the apparatus 1102 (e.g., a UE) for wireless communication includes means for receiving a signal that includes dormancy status information for a set of selected physical cell identifiers (PCIs), means for, for each PCI in the set of selected PCIs indicated by the dormancy status information as associated with a dormant state, refraining from Physical Downlink Control Channel (PDCCH) monitoring on a dormant bandwidth part (BWP) to which the respective PCI transitions, and means for, for each PCI in the set of selected PCIs indicated by the dormancy status information as associated with a non-dormant state, performing PDCCH monitoring on a non-dormant BWP to which the respective PCI transitions.

The aforementioned means may be one or more of the aforementioned components of the apparatus 1102 and/or the processing system 1214 of the apparatus 1102 configured to perform the functions recited by the aforementioned means. As described supra, the processing system 1214 may include the TX processor 264, the RX processor 258, and the controller/processor 280.

Figure 13:
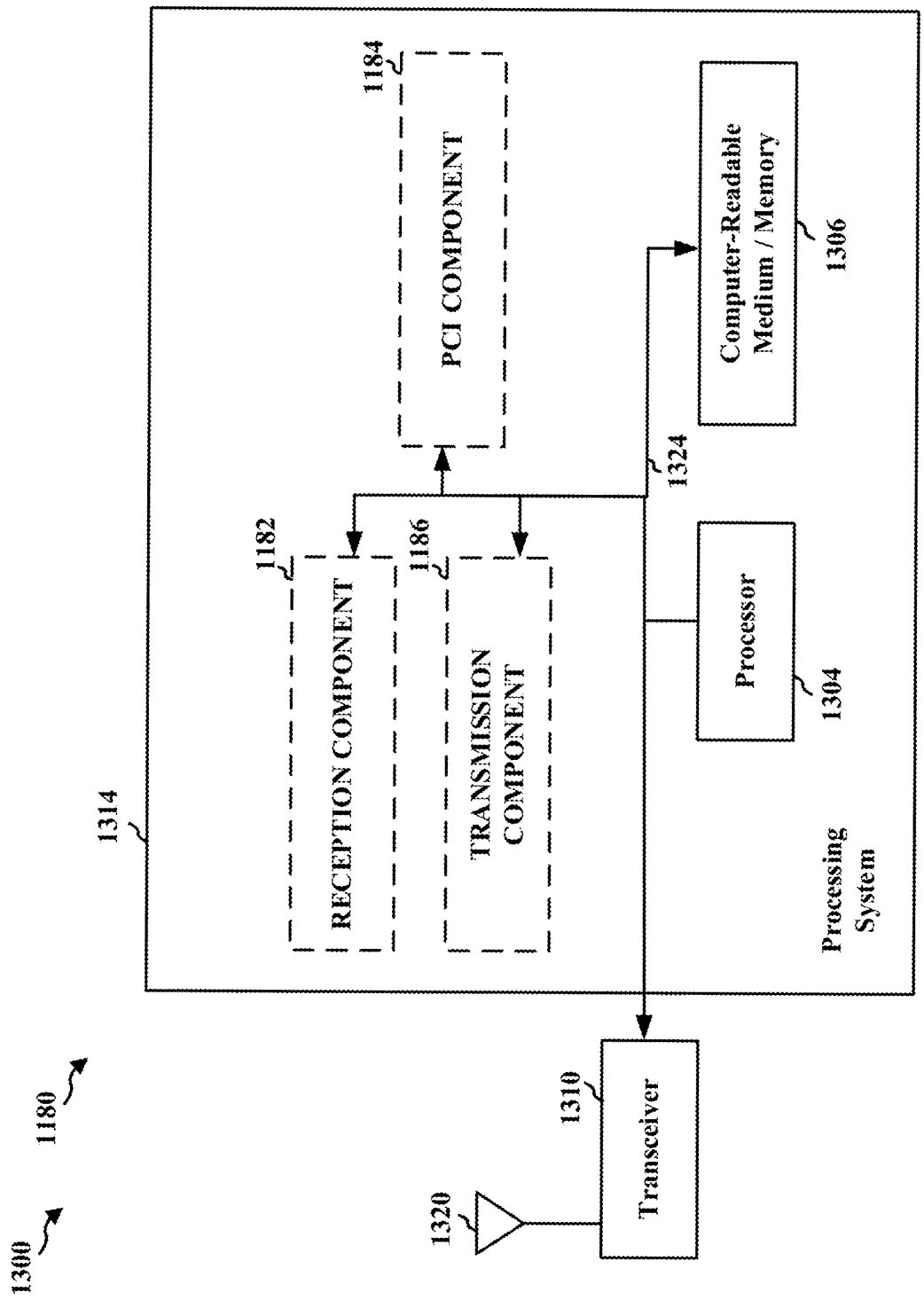
FIG. 13 is a diagram illustrating another example of a hardware implementation for an apparatus employing a processing system.

FIG. 13 is a diagram 1300 illustrating an example of a hardware implementation for an apparatus 1180 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1182, 1184 and 1186, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1182. In addition, the transceiver 1310 receives information from the processing system 1314, specifically the transmission component 1186, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1182, 1184 and 1186. The components may be software components running in the processor 1304, resident/stored in the computer readable medium/memory 1306, one or more hardware components coupled to the processor 1304, or some combination thereof. The processing system 1314 may be a component of the BS 110 of FIG. 2 and may include the memory 242, and/or at least one of the TX processor 220, the RX processor 238, and the controller/processor 240.

In one configuration, the apparatus 1180 (e.g., a BS) for wireless communication includes means for transmitting, to a user equipment (UE), a wake-up signal (WUS) that includes an indication of selected physical cell identifiers (PCIs) of a PCI group, and means for transmitting, to the UE based on the WUS, one or more configured DRX ON durations associated with the selected PCIs of the PCI group. The apparatus 1180 for wireless communication further optionally includes means for receiving a measurement report, from the UE, a measurement report associated with a configured DRX ON duration that precedes the WUS, and means for selecting the selected PCIs of the PCI group based on the measurement report.

In another configuration, the apparatus 1180 (e.g., a BS) for wireless communication includes means for transmitting, to a user equipment (UE), a signal that includes dormancy status information for a set of selected physical cell identifiers (PCIs), means for, for each PCI in the set of selected PCIs indicated by the dormancy status information as associated with a dormant state, transitioning the respective PCI to a dormant bandwidth part (BWP) without PDCCH communications targeted to the UE, and means for, for each PCI in the set of selected PCIs indicated by the dormancy status information as associated with a non-dormant state, transitioning the respective PCI to a non-dormant BWP with PDCCH communications targeted to the UE.

The aforementioned means may be one or more of the aforementioned components of the apparatus 1180 and/or the processing system 1314 of the apparatus 1180 configured to perform the functions recited by the aforementioned means. As described supra, the processing system 1314 may include the TX processor 220, the RX processor 238, and the controller/processor 240.

As used herein, the term "component" is intended to be broadly construed as hardware, firmware, and/or a combination of hardware and software. As used herein, a processor is implemented in hardware, firmware, and/or a combination of hardware and software.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: receiving a wake-up signal (WUS) that includes an indication of selected physical cell identifiers (PCIs) of a PCI group; and monitoring, in response to the WUS, one or more configured DRX ON durations associated with the selected PCIs of the PCI group.

Clause 2. The method of clause 1, wherein the PCI group is associated with all candidate transmission reception points (TRPs) of a single serving cell, or wherein the PCI group is associated with TRPs associated with a plurality of candidate serving cells, or a combination thereof.

Clause 3. The method of any of clauses 1 to 2, wherein the one or more configured DRX ON durations associated with the selected PCIs of the PCI group includes the next configured DRX ON duration subsequent to the WUS.

Clause 4. The method of any of clauses 1 to 3, wherein the one or more configured DRX ON durations associated with the selected PCIs of the PCI group includes the next N configured DRX ON durations subsequent to the WUS, N being an integer that is greater than or equal to 2.

Clause 5. The method of any of clauses 1 to 4, wherein the one or more configured DRX ON durations associated with the selected PCIs of the PCI group includes each subsequent configured DRX ON duration subsequent to the WUS until instructed otherwise.

Clause 6. The method of any of clauses 1 to 5, wherein the one or more configured DRX ON durations associated with the selected PCIs of the PCI group includes a designated set of configured DRX ON durations configured by a base station.

Clause 7. The method of any of clauses 1 to 6, further comprising: transmitting a measurement report associated with a configured DRX ON duration that precedes the WUS, wherein the selected PCIs of the PCI group are based on the measurement report.

Clause 8. A method of operating a base station, comprising: transmitting, to a user equipment (UE), a wake-up signal (WUS) that includes an indication of selected physical cell identifiers (PCIs) of a PCI group; and transmitting, to the UE based on the WUS, on one or more configured DRX ON durations associated with the selected PCIs of the PCI group.

Clause 9. The method of clause 8, further comprising: receiving a measurement report, from the UE, a measurement report associated with a configured DRX ON duration that precedes the WUS; and selecting the selected PCIs of the PCI group based on the measurement report.

Clause 10. The method of any of clauses 8 to 9, wherein the PCI group is associated with all candidate transmission reception points (TRPs) of a single serving cell, or wherein the PCI group is associated with a plurality of candidate serving cells, or a combination thereof.

Clause 11. The method of any of clauses 8 to 10, wherein the one or more configured DRX ON durations associated with the selected PCIs of the PCI group includes the next configured DRX ON duration subsequent to the WUS.

Clause 12. The method of any of clauses 8 to 11, wherein the one or more configured DRX ON durations associated with the selected PCIs of the PCI group includes the next N configured DRX ON durations subsequent to the WUS, N being an integer that is greater than or equal to 2.

Clause 13. The method of any of clauses 8 to 12, wherein the one or more configured DRX ON durations associated with the selected PCIs of the PCI group includes each subsequent configured DRX ON duration subsequent to the WUS until instructed otherwise.

Clause 14. The method of any of clauses 8 to 13, wherein the one or more configured DRX ON durations associated with the selected PCIs of the PCI group includes a designated set of configured DRX ON durations configured by the base station.

Clause 15. A method of operating a user equipment (UE), comprising: receiving a signal that includes dormancy status information for a set of selected physical cell identifiers (PCIs); for each PCI in the set of selected PCIs indicated by the dormancy status information as associated with a dormant state, refraining from Physical Downlink Control Channel (PDCCH) monitoring on a dormant bandwidth part (BWP) to which the respective PCI transitions; and for each PCI in the set of selected PCIs indicated by the dormancy status information as associated with a non-dormant state, performing PDCCH monitoring on a non-dormant BWP to which the respective PCI transitions.

Clause 16. The method of clause 15, wherein the signal is received in a downlink control information (DCI) communication in a search space monitored by the UE outside of an active time.

Clause 17. The method of clause 16, wherein the signal comprises a wake-up signal (WUS).

Clause 18. The method of any of clauses 15 to 17, wherein the signal is received in a downlink control information (DCI) communication in a search space monitored by the UE inside of an active time.

Clause 19. The method of any of clauses 15 to 18, wherein the dormancy status information for each selected PCI in the set of selected PCIs is indicated explicitly per selected PCI.

Clause 20. The method of any of clauses 15 to 19, wherein the dormancy status information for each selected PCI in the set of selected PCIs is indicated implicitly per PCI group.

Clause 21. The method of clause 20, wherein the PCI group is associated with all candidate transmission reception points (TRPs) of a single serving cell.

Clause 22. The method of any of clauses 20 to 21, wherein the PCI group is associated with TRPs associated with a plurality of candidate serving cells, or a combination thereof.

Clause 23. A method of operating a base station, comprising: transmitting, to a user equipment (UE), a signal that includes dormancy status information for a set of selected physical cell identifiers (PCIs); and for each PCI in the set of selected PCIs indicated by the dormancy status information as associated with a dormant state, transitioning the respective PCI to a dormant bandwidth part (BWP) without PDCCH communications targeted to the UE; and for each PCI in the set of selected PCIs indicated by the dormancy status information as associated with a non-dormant state, transitioning the respective PCI to a non-dormant BWP with PDCCH communications targeted to the UE.

Clause 24. The method of clause 23, wherein the signal is transmitted in a downlink control information (DCI) communication in a search space outside of an active time of the UE.

Clause 25. The method of clause 24, wherein the signal comprises a wake-up signal (WUS).

Clause 26. The method of any of clauses 23 to 25, wherein the signal is transmitted in a downlink control information (DCI) communication in a search space inside of an active time of the UE.

Clause 27. The method of any of clauses 234 to 26, wherein the dormancy status information for each selected PCI in the set of selected PCIs is indicated explicitly per selected PCI.

Clause 28. The method of any of clauses 23 to 27, wherein the dormancy status information for each selected PCI in the set of selected PCIs is indicated implicitly per PCI group.

Clause 29. The method of clause 28, wherein the PCI group is associated with all candidate transmission reception points (TRPs) of a single serving cell.

Clause 30. The method of any of clauses 28 to 29, wherein the PCI group is associated with TRPs associated with a plurality of candidate serving cells.

Clause 31. An apparatus comprising a memory and at least one processor communicatively coupled to the memory, the memory and the at least one processor configured to perform a method according to any of clauses 1 to 30.

Clause 32. An apparatus comprising means for performing a method according to any of clauses 1 to 30.

Clause 33. A non-transitory computer-readable medium storing computer-executable instructions, the computer-executable comprising at least one instruction for causing a computer or processor to perform a method according to any of clauses 1 to 30.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a user equipment (UE), comprising:
    transmitting a measurement report during a configured DRX ON duration that precedes a wake-up signal (WUS), the measurement report including measurements of cells associated with a physical cell identifier (PCI) Group;
    receiving a wake-up signal (WUS) that includes an indication of selected PCIs of the PCI group; and
    monitoring, in response to the WUS, one or more configured DRX ON durations associated with the selected PCIs of the PCI group.

2. The method of claim 1,
    wherein the PCI group is associated with all candidate transmission reception points (TRPs) of a single serving cell, or
    wherein the PCI group is associated with TRPs associated with a plurality of candidate serving cells, or
    a combination thereof.

3. The method of claim 1, wherein the one or more configured DRX ON durations associated with the selected PCIs of the PCI group includes a next configured DRX ON duration subsequent to the WUS.

4. The method of claim 1, wherein the one or more configured DRX ON durations associated with the selected PCIs of the PCI group includes a next N configured DRX ON durations subsequent to the WUS, N being an integer that is greater than or equal to 2.

5. The method of claim 1, wherein the one or more configured DRX ON durations associated with the selected PCIs of the PCI group includes each subsequent configured DRX ON duration subsequent to the WUS until instructed otherwise.

6. The method of claim 1, wherein the one or more configured DRX ON durations associated with the selected PCIs of the PCI group includes a designated set of configured DRX ON durations configured by a base station.

7. A method of operating a base station, comprising:
    receiving a measurement report, from a user equipment (UE), during a configured DRX ON duration that precedes a wake-up signal (WUS);
    selecting physical cell identifiers, PCIs, of a PCI group based on the measurement report;
    transmitting, to a user equipment (UE), the WUS that includes an indication of selected physical cell identifiers (PCIs) of a PCI group; and
    transmitting, to the UE based on the WUS, during one or more configured DRX ON durations associated with the selected PCIs of the PCI group.

8. The method of claim 7,
wherein the PCI group is associated with all candidate transmission reception points (TRPs) of a single serving cell, or
wherein the PCI group is associated with a plurality of candidate serving cells, or
a combination thereof.

9. The method of claim 7, wherein the one or more configured DRX ON durations associated with the selected PCIs of the PCI group includes a next configured DRX ON duration subsequent to the WUS.

10. The method of claim 7, wherein the one or more configured DRX ON durations associated with the selected PCIs of the PCI group includes a next N configured DRX ON durations subsequent to the WUS, N being an integer that is greater than or equal to 2.

11. The method of claim 7, wherein the one or more configured DRX ON durations associated with the selected PCIs of the PCI group includes each subsequent configured DRX ON duration subsequent to the WUS until instructed otherwise.

12. The method of claim 7, wherein the one or more configured DRX ON durations associated with the selected PCIs of the PCI group includes a designated set of configured DRX ON durations configured by the base station.

13. A user equipment (UE) for wireless communication, comprising:
a memory; and
one or more processors operatively coupled to the memory, the memory and the one or more processors configured to:
transmit a measurement report during a configured DRX ON duration that precedes a wake-up signal (WUS), the measurement report including measurements of cells associated with a physical cell identifier (PCI) Group;
receive WUS that includes an indication of selected PCIs of the PCI group; and
monitor, in response to the WUS, one or more configured DRX ON durations associated with the selected PCIs of the PCI group.

14. The UE of claim 13,
wherein the PCI group is associated with all candidate transmission reception points (TRPs) of a single serving cell, or
wherein the PCI group is associated with TRPs associated with a plurality of candidate serving cells, or
a combination thereof.

15. The UE of claim 13, wherein the one or more configured DRX ON durations associated with the selected PCIs of the PCI group includes a next configured DRX ON duration subsequent to the WUS.

16. The UE of claim 13, wherein the one or more configured DRX ON durations associated with the selected PCIs of the PCI group includes a next N configured DRX ON durations subsequent to the WUS, N being an integer that is greater than or equal to 2.

17. The UE of claim 13, wherein the one or more configured DRX ON durations associated with the selected PCIs of the PCI group includes each subsequent configured DRX ON duration subsequent to the WUS until instructed otherwise.

18. The UE of claim 13, wherein the one or more configured DRX ON durations associated with the selected PCIs of the PCI group includes a designated set of configured DRX ON durations configured by a base station.

19. A network entity, comprising:
a memory; and
one or more processors operatively coupled to the memory, the memory and the one or more processors configured to:
receive a measurement report, from a user equipment UE during a configured DRX ON duration that precedes a wake-up signal (WUS);
select physical cell identifiers, PCIs, of a PCI group based on the measurement report;
transmit, to the (UE), the WUS that includes an indication of selected physical cell identifiers (PCIs) of a PCI group; and
transmit, to the UE based on the WUS, during one or more configured DRX ON durations associated with the selected PCIs of the PCI group.

20. The network entity of claim 19,
wherein the PCI group is associated with all candidate transmission reception points (TRPs) of a single serving cell, or
wherein the PCI group is associated with a plurality of candidate serving cells, or
a combination thereof.

21. The network entity of claim 19, wherein the one or more configured DRX ON durations associated with the selected PCIs of the PCI group includes a next configured DRX ON duration subsequent to the WUS.

22. The network entity of claim 19, wherein the one or more configured DRX ON durations associated with the selected PCIs of the PCI group includes a next N configured DRX ON durations subsequent to the WUS, N being an integer that is greater than or equal to 2.

23. The network entity of claim 19, wherein the one or more configured DRX ON durations associated with the selected PCIs of the PCI group includes each subsequent configured DRX ON duration subsequent to the WUS until instructed otherwise.

24. The network entity of claim 19, wherein the one or more configured DRX ON durations associated with the selected PCIs of the PCI group includes a designated set of configured DRX ON durations configured by the base station.

\* \* \* \* \*